United States Patent [19]

Krakow et al.

[11] 4,322,596
[45] Mar. 30, 1982

[54] APPARATUS FOR PRODUCING LARGE SHAFTS BY WELDING BUILD UP

[75] Inventors: Heinz Krakow; Harald Tomsen; Jürgen Herm, all of Hamburg, Fed. Rep. of Germany

[73] Assignee: Blohm & Voss AG, Hamburg, Fed. Rep. of Germany

[21] Appl. No.: 102,372

[22] Filed: Dec. 11, 1979

[30] Foreign Application Priority Data

Dec. 18, 1978 [DE] Fed. Rep. of Germany ....... 2854683

[51] Int. Cl.³ .......................... B23K 9/18; B23K 37/02
[52] U.S. Cl. .............................. 219/73.21; 219/76.14; 219/60 R; 219/125.1
[58] Field of Search ..................... 219/73, 73.11, 73.2, 219/73.21, 76.1, 76.14, 124.31, 125.1, 60 R; 228/25, 32, 45

[56] References Cited

U.S. PATENT DOCUMENTS

| | | | |
|---|---|---|---|
| 1,965,331 | 7/1934 | Chapman | 219/124.31 |
| 3,182,177 | 5/1965 | Anderson | 219/73.21 |
| 3,305,663 | 2/1967 | Janssen | 219/76.1 |
| 3,558,846 | 1/1971 | Ujiie | 219/73.21 |
| 3,684,855 | 8/1972 | Wepfer et al. | 219/73.21 X |
| 4,115,684 | 9/1978 | Lindbom | 219/125.1 X |
| 4,175,224 | 11/1979 | Sims et al. | 219/60 R |

FOREIGN PATENT DOCUMENTS 2445891 4/1976 Fed. Rep. of Germany ... 219/76.14

Primary Examiner—J. V. Truhe
Assistant Examiner—Keith E. George
Attorney, Agent, or Firm—Toren, McGeady & Stanger

[57] ABSTRACT

Apparatus for producing cylindrical bodies by building-up weld material thereon utilizing a submerged arc welding process includes a plurality of welding heads movable along the cylindrical body parallel to the axis thereof, and devices for supplying welding wire and welding powder to respective welding heads of the apparatus. A welding head carriage and a separate supply carriage supporting, respectively, each of the welding heads and the welding wire and powder supply units are provided, and drive mechanisms are also provided separately for each welding head carriage and supply unit carriage.

5 Claims, 4 Drawing Figures

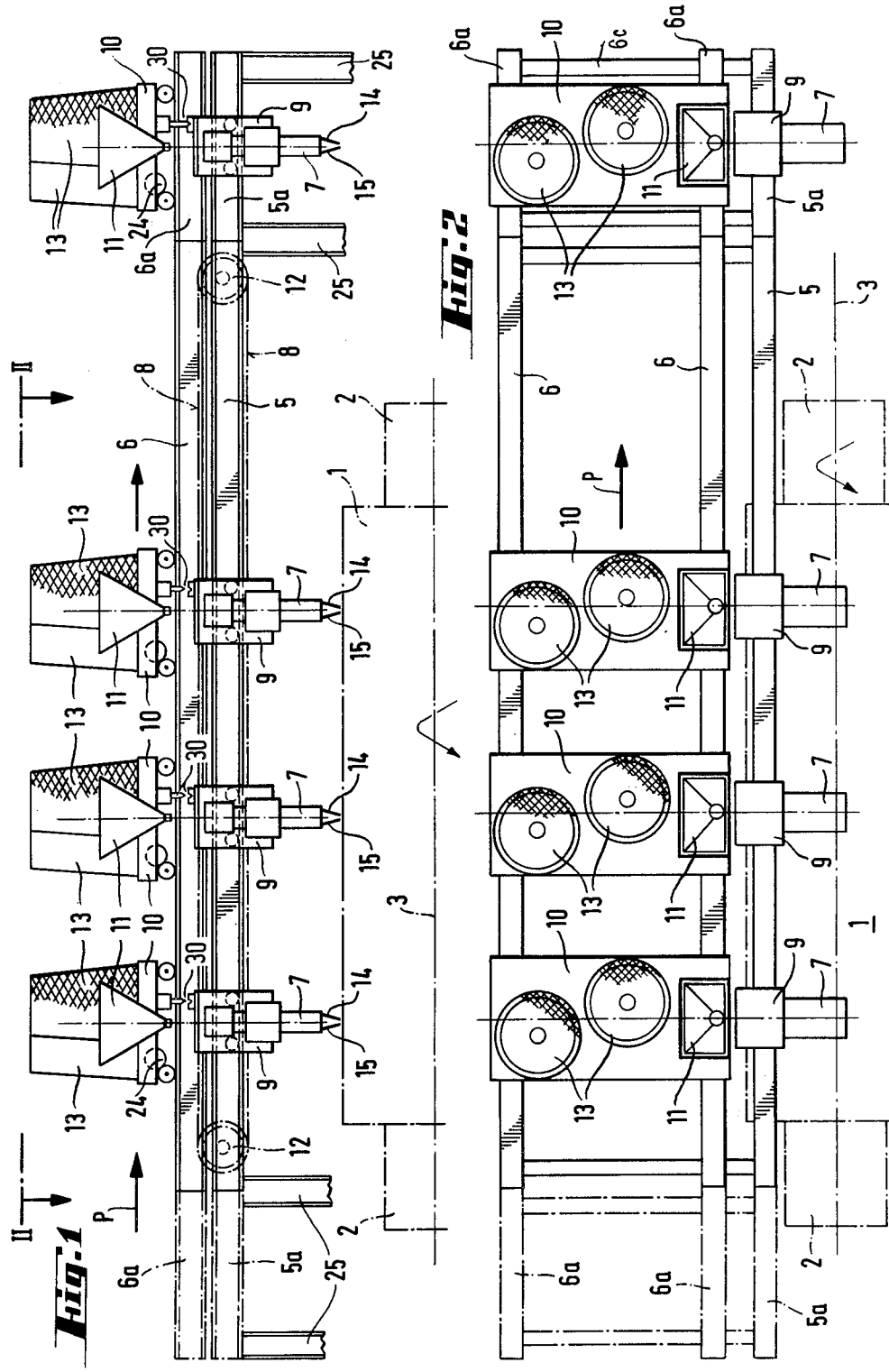

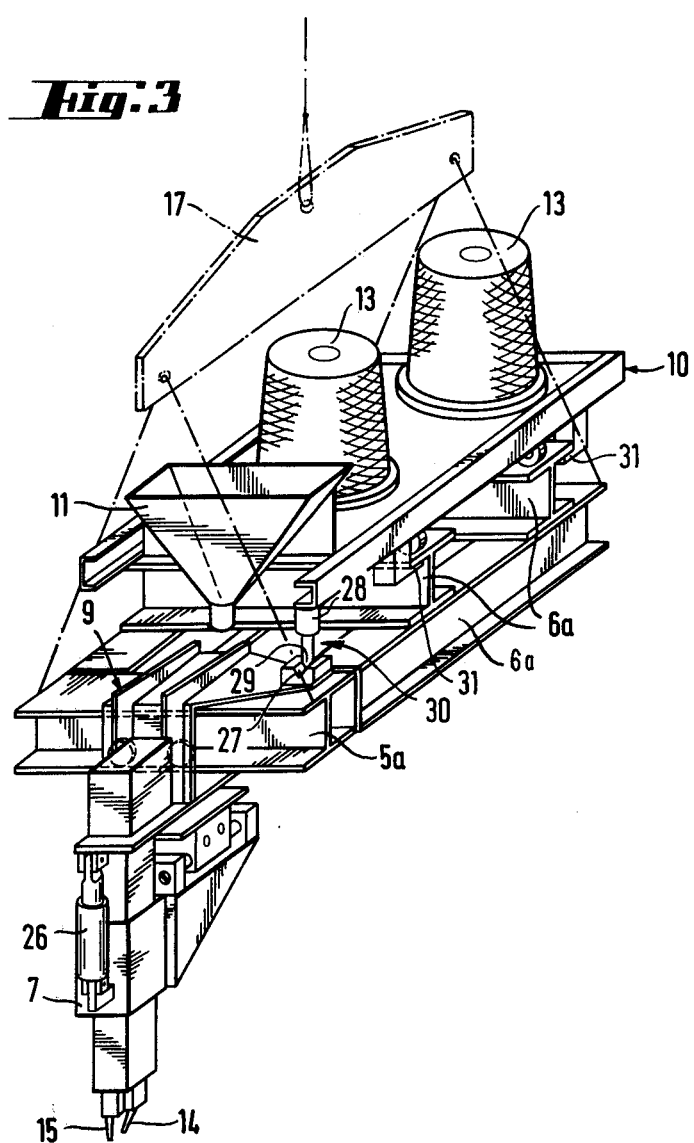

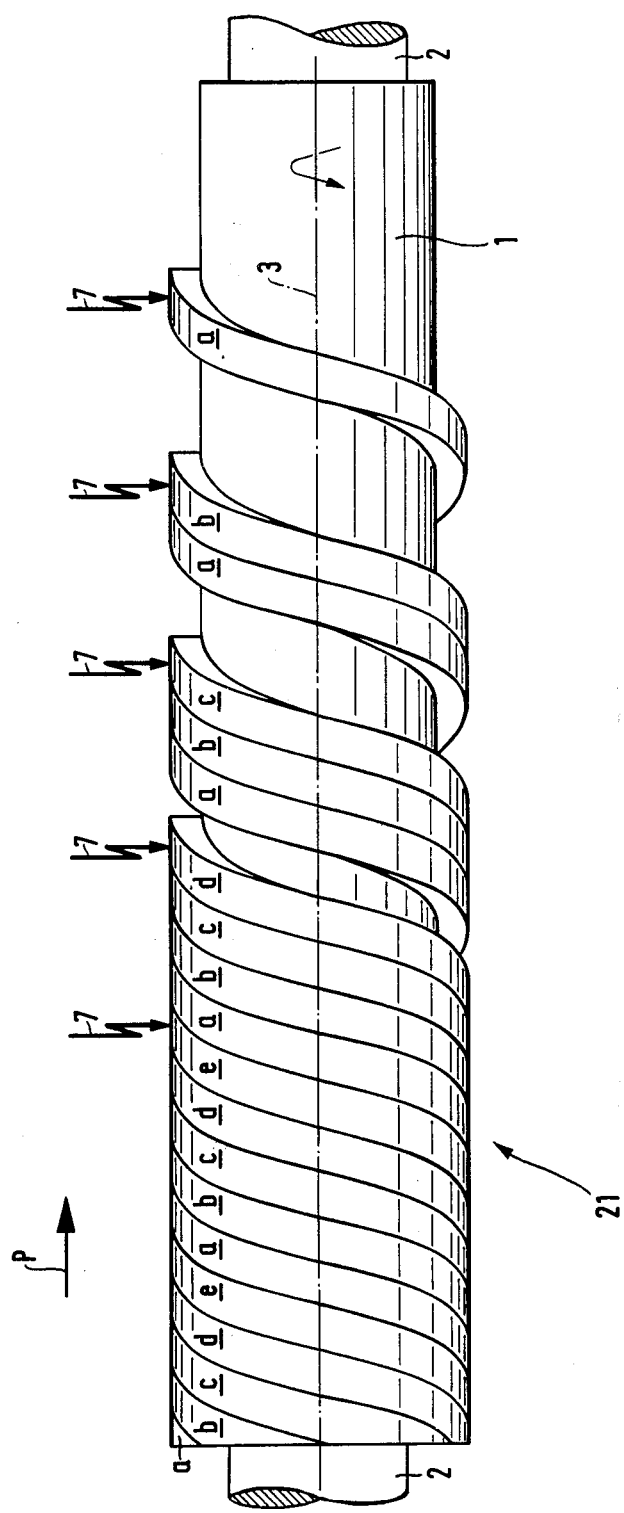

APPARATUS FOR PRODUCING LARGE SHAFTS BY WELDING BUILD UP

The present invention relates generally to welding apparatus and more particularly to apparatus for production of cylindrical bodies, for example, oversized turbine or generator shafts, by utilization of a rotating steel core onto which there can be applied by means of a welding device traveling in axial direction of the core a plurality of layers of helically extending welding beads as a built-up weld produced by a submerged arc welding mechanism.

It is known in the prior art, for example, from German Auslegeschrift No. 23 20 186, to produce large cylindrical bodies, e.g. with weights of 80 tons and more, by means of shape welding, particularly by submerged arc welding, because for obvious reasons it is difficult to produce such large components by casting or forging techniques.

Known methods and arrangements for producing such large components from built-up welding material are not very satisfactory since built-up welding is extremely time-consuming, especially when the built-up weld must be of a special quality. However, special quality may be absolutely required in the production of certain components such as, for example, turbine or generator shafts.

Many attempts have been made to meet these requirements and to simultaneously ensure a manner of operation which is as economical and as efficient as possible. However, a really useful solution has not as yet been found.

The present invention seeks to perform the task of providing equipment which will operate in an efficient manner and which constitutes a suitably designed arrangement for the purpose involved.

SUMMARY OF THE INVENTION

The apparatus of the present invention comprises a welding device which consists of a plurality of welding units which can be moved parallel to the core axis of the cylindrical body to be formed and which are arranged in the same horizontal plane. By utilizing a manner of operation which shall be described hereinbelow, it becomes possible to reduce the work heretofore required for producing the desired built-up weld in dependence upon the welding units employed.

In the arrangement created in accordance with the invention, a significant utilization of welding wire and welding powder must be expected. This consumption depends essentially upon the length and the thickness of the built-up weld to be produced. Assuming that, for example, the weight of the supply of welding wire is approximately two tons and that of the welding powder is approximately 800 kilograms, a total weight of the supply carriage, at least prior to starting work, of about six tons must be expected.

It must further be taken into consideration that the welding carraige and the supply carriage may be moved only relatively slowly parallel to the core axis, wherein substantial demands are made on the control of the welding carriage, i.e. the accuracy of the drive of the welding carriage. In order to produce an exact welding bead having the desired quality, tolerances of ±1 mm for each rotation about the core axis may not be exceeded.

In accordance with another feature of the invention, this is achieved by forming the welding unit to consist of a welding head and a supply of welding wire and welding powder for supplying the welding head, wherein the welding head, on the one hand, and the supply of welding wire and welding powder, on the other hand, are arranged on separate carriages, with the welding carriage and the supply carriage being provided with separate drives.

From the foregoing, it will be clear that, during the production sequence, all the welding carriages as well as all the supply carriages can be moved and controlled over the entire longitudinal axis of the core. This is achieved in an advantageous manner in that the welding carriages can be synchronously moved axially relative to the core axis by means, for example, of a precision control chain, while the supply carriages are self-propelled. Moreover, the apparatus ensures that the welding carriage and the supply carriage can be moved on separate tracks.

Accordingly, the arrangement provided in accordance with the invention is constructed in such a way that the actual welding system is separated from the supply system. In this manner, an absolutely synchronized travel of all welding carriages is ensured, and it is possible to control the welding carriage within narrow tolerances, while the supply carriages which have a higher weight can be less precisely controlled.

Furthermore, the separation of the two systems comprising the welding carriage and supply carriage improves the desired synchronous travel of all welding carriages because the chain drive is not negatively influenced by varying loads caused by the consumption of wire and powder. It is clear that it is not always possible to maintain a continuously constant supply during the production procedure. On the contrary, the weight of the supply carriage is subject to continuous change because of the on-going consumption of wire and powder. Accordingly, primarily for this reason, the supply carriages are arranged to be self-propelled by means not shown in detail, while the welding carriages are synchronously driven, for example, through an endless precision steel chain. The chain is guided by chain or deflection wheels arranged in the region of the rails and a motor driving the chain is preferably infinitely adjustable with respect to its speed.

To ensure efficient, time-saving utilization of all welding units, special precautions should be taken, among these being the special measure whereby each welding unit is returned into its initial position after reaching its end position.

In accordance with another feature of the invention, this mode of operation is facilitated by arranging the welding carriage and the supply carriage to be jointly coupled and transferred. Thus, each welding carriage and each supply carriage assigned thereto can be combined into a transferable welding unit.

Thus, it is possible in a simple manner to return each welding unit which has reached its end position into an initial position, where it is again ready to commence a new run. Particularly, this can be achieved without problems when those track portions for the welding carriage and the supply carriage which have been last used as viewed in the direction of welding are arranged on a separate base or support structure which the end portions of the track have in common and when the base structure, together with the coupled welding unit, can be transferred by means of a hoist.

As soon as a welding unit has been returned into its initial position, it remains in a stationary position until the next welding unit which is still operating to apply a second welding bead has reached its end position. During this stationary period the respective welding unit may receive new supplies and the distance of a welding head from the core may be corrected in accordance with the thickness of the weld which has already been produced.

For this reason, the apparatus is provided with the ability to compensate for the growing built-up weld by having the welding head slidably, vertically adjustably supported in the welding carriage. Furthermore, a capacitive vertical adjustment may be provided which, operating automatically, readjusts the distance between the core or the built-up weld and the welding tip when the desired distance has been changed in excess of desired tolerances due to irregularities, for example, a non-uniform thickness of the welding bead.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 1 is a side view showing schematically the system according to the invention;

FIG. 2 is a top view of the apparatus of FIG. 1;

FIG. 3 is a perspective view showing a welding unit in an enlarged scale; and

FIG. 4 is a schematic representation of the first layer to a built-up weld produced on a core by means of the apparatus.

DETAILED DESCRIPTION OF THE PREFERRED EMBODIMENT

The apparatus of the invention is best illustrated in FIGS. 1 and 2, wherein there is shown a steel core 1 which, through shafts 2 provided at both its ends, can be rotatably driven in a manner which is not illustrated in detail. The longitudinal axis of the core is denoted by reference numeral 3. A machine frame arranged above the core 1 has rails 5 and 6 serving as tracks, the rails having transferable end portions 5a and 6a joined by an end cross member 6c.

The rails 5 and 6 and their end portions 5a and 6a serve as the track for a plurality of welding units with four welding units being shown by way of example (see also FIG. 3). Each welding unit consists of a welding carriage 9 provided with a welding head 7, and a supply carriage 10. The supply carriage 10 serves for stocking the welding material, i.e., for receiving the welding powder (not shown) arranged in a container 11 and preferably two wire reels 13 which form the material for the fusion or melting electrodes 14 and 15 (see FIG. 3).

As can be seen especially from FIG. 3, the welding carriage 9 and the supply carriage 10 can be coupled to each other by means of coupling 30 and fastened on the end portions 5a and 6a of the rails 5 and 6. The coupling 30 is actuated by means of a pneumatic cylinder 28 having rods 29 whose ends engage in a corresponding slotted member 27 attached at the welding carriage 9.

Flanges 31 are provided to absorb coupling torque. The resulting structure forming a welding and transportation unit can be lifted out of the end position by means of a hoist 17 and can be transferred into the initial or starting position of a welding operation which is indicated by a dash-dot representation of end portions 5a, 6a in FIGS. 1 and 2. The direction of production is indicated by arrow P in FIG. 1. The welding head 7 is provided with means for enabling vertical adjustment and setting thereof to compensate for the increasing built-up weld 21 (FIG. 4) and as illustrated in FIG. 3 such means may comprise adjusting cylinder 26.

In FIG. 4, the manner of operation of the apparatus according to the invention is schematically illustrated. In accordance with the embodiment depicted, there are helically applied on the cylindrical steel core 1 altogether five welding beads, a, b, c, d and e, i.e., each of the welding heads 7 applies one or more welding beads whose pitch is such that it equals the product of the width of the beads times the number of the welding heads 7 which simultaneously participate in the production of the welding material build-up 21.

Accordingly, it is apparent from FIG. 4 that a plurality of helically extending welding beads a-e can be applied on the rotating core 1 in one work step each time that a layer of the welding material build-up is applied. In this connection, it must be taken into consideration that the rotation of the core and the speed of feed of the welding heads 7, actuated by a chain drive means 8, 12, determine the pitch of the welding beads to be applied helically, so that all the welding heads 7 participating in the formation of the welding material build-up 21 operate essentially with the same speed of rotation and feed.

In further explanation of the manner of operation of the apparatus in accordance with the invention it should be pointed out that, after applying the first helically extending welding bead a, the respective welding device consisting of the supply carriage 10 and the welding carriage 9, will have reached its end position and it will have traveled onto the rail end portions of 5a and 6a. In this location, the two carriages 9, 10 are coupled to each other and fastened or braced together and, finally, the welding unit comprised of these elements is returned to the initial position together with the end portions 5a, 6a by means of the hoist 17.

In this initial position, which can also be considered a temporary stationary position, the supply carriage 10 receives new supplies, so that its stocks of welding wire and welding powder can be supplemented. Simultaneously, the corresponding welding head 7 is newly adjusted to compensate for the level of welding material build-up, and its vertical position is corrected in accordance with the welding bead already applied. Finally, the two carriages 9, 10 are separated from each other and they are uncoupled.

After the second welding device has almost completely applied the welding bead b, the first welding device which is still in its stationary position is brought into the operating position, where the welding carriage 9 is once again engaged with the drive chain 8 which engages the chain wheels 12 and the drive means 24 of the corresponding supply carriage 10 is put into operation. The corresponding welding device now begins to apply another welding bead. In the meantime, the unloaded track end portions 5a, 6a will have been brought into their end position, so that the second welding device leaving its end position can travel onto these track end portions.

The above-described continuous production sequence is repeated until the built-up weld 21 has reached the desired thickness.

In order to compensate for the continuously increasing built-up weld and the resultant steadily increasing peripheral speed of the rotating core, the rate of rotation of the core must be corrected. Thus, the rate of rotation of the core is reduced to such an extent that the welding heads which are in use apply an exact welding bead of desired width and thickness. In this connection, measures must be taken to ensure that all the welding beads forming the built-up weld layer blend into one another and, moreover, that a homogenous structure of high quality is obtained.

The manner of operation schematically illustrated in FIG. 4 is to be considered related to only one embodiment of the invention. It should be understood that the arrangement provided in accordance with the invention will enable other methods to be utilized. However, it has been found that the manner of operation described above is especially advantageous, particularly when it is taken in consideration that the structural width of the supply carriage is essentially determined by the supply of welding wire arranged on two wire reels of large size and the supply of powder. Due to the suitable separation of the two systems and the fact that they are arranged one above the other, substantial space is saved so that a significantly greater number of welding carriages or welding heads can be utilized, and so that a significantly higher melting output per unit time can be achieved as compared with prior devices.

While a specific embodiment of the invention has been shown and described in detail to illustrate the application of the inventive principles, it will be understood that the invention may be embodied otherwise without departing from such principles.

What is claimed is:
1. Apparatus for producing cylindrical bodies by building-up weld material thereon utilizing a submerged arc welding process comprising: a plurality of welding heads movable along said cylindrical body parallel to the axis thereof; individual supply means for each of said welding heads, said supply means supplying welding wire and welding powder individually to each of said welding heads; a welding head carriage supporting each of said welding heads; a separate supply means carriage supporting each of said individual supply means; and drive means provided separately for each of said welding head carriage and said supply means carriage; with a plurality of said welding head carriages and supply means carriages being arranged in the same horizontal plane and with said welding head carriages being moved synchronously parallel to the axis of said cylindrical body while said supply means carriages are self-propelled.

2. Apparatus according to claim 1 wherein said welding head carriages and said supply means carriages are movable on separate tracks.

3. Apparatus according to claim 2 wherein track portions for said welding head carriage and track portions for said supply means carriage last used in the performance of said weld material build-up are arranged detachably on a base structure common to said last-used track portions, said apparatus further including a hoist for effecting transfer of said base structure.

4. Apparatus according to claim 1 wherein said welding head carriage and said supply means carriage are arranged to be jointly coupled and at completion of a welding cycle transferred back to a starting point of said welding cycle.

5. Apparatus according to claim 1 further including means for vertically adjusting said welding heads in order to compensate for increasing weld material build-up on said cylindrical bodies.

* * * * *